R. SEBILLE.

Potato-Mashers and Strainers.

No. 140,169. Patented June 24, 1873.

Witnesses.
W. B. Masson
D. P. Cowl

Inventor
René Sebille
by atty. Edmund Masson

UNITED STATES PATENT OFFICE.

RÉNÉ SEBILLE, OF BALTIMORE, MARYLAND.

IMPROVEMENT IN POTATO MASHERS AND STRAINERS.

Specification forming part of Letters Patent No. 140,169, dated June 24, 1873; application filed May 5, 1873.

*To all whom it may concern:*

Be it known that I, RÉNÉ SEBILLE, of Baltimore, in the county of Baltimore and State of Maryland, have invented an Improved Potato Masher and Strainer; and that the following is a full, clear, and exact description of the construction and operation of the same, reference being had to the accompanying drawings making a part of this specification, in which—

Figure 1:
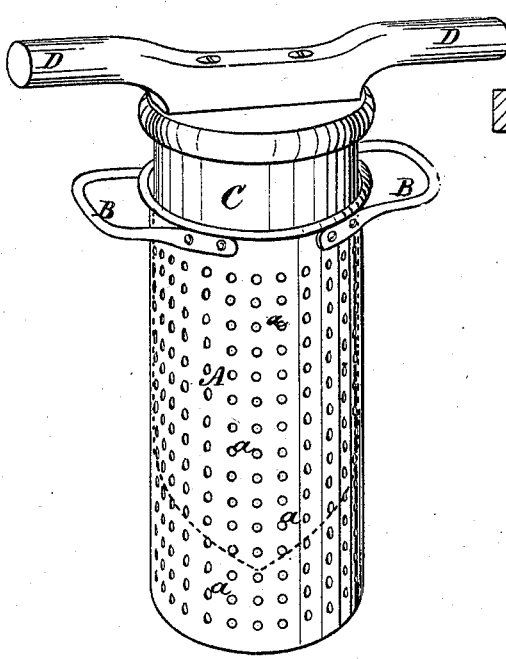
Figure 2:
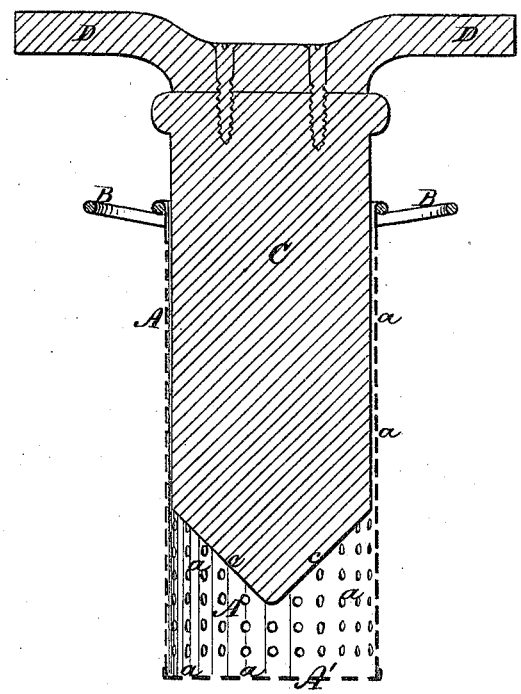
Figure 3:
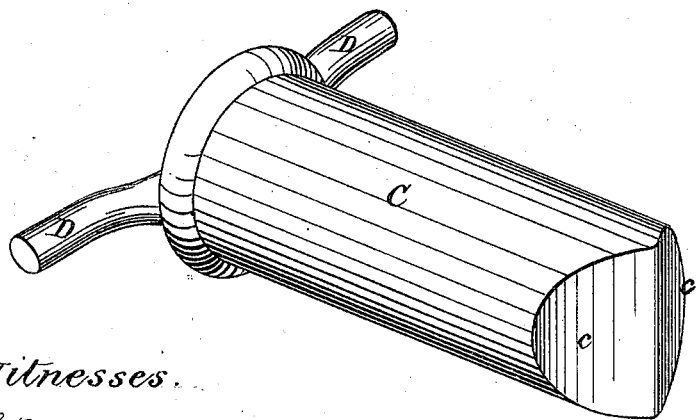

Figure 1 represents a perspective view of the potato masher and strainer. Fig. 2 represents the same in vertical section. Fig. 3 represents a perspective view of the potato-masher removed from the strainer.

Similar letters of reference, where they occur, denote like parts in all the figures.

My invention relates to the manner in which I have combined a plunger, which can be rotated back and forth or continuously, with a cylindrical strainer, through which the potato-mash can issue as fast as it is produced. The end of the plunger, being formed in a wedge or double-beveled-faced shape, can be operated with the least possible amount of power.

To enable others skilled in the art to make and use my invention, I will proceed to describe the same with reference to the drawings.

A represents a cylindrical strainer, provided with perforations $a$ all around its circumference, through which the substance to be mashed can escape as soon as it is produced. The bottom A' is also provided with perforations $a$ for the free issue of the mashed potatoes. This strainer is provided with handles B, by which it can be carried or held in position during the operation of mashing vegetables. It can also be provided with legs to support it over a dish used to receive the triturated material; or it can have suitable projections to fasten it to the side of a table. C represents the plunger, which is cylindrical for the most of its length, at the end in the form of an obtuse brad-awl, its two faces, $c\ c$, being well adapted to mash any potatoes placed in the strainer, and force them through the openings $a$. This plunger C fits loosely in the strainer A, and is provided with two handles, D, by which it can be rotated back and forth or continuously inside the strainer. I prefer to extend the cylindrical form of the plunger C from its wedge end $c\ c$ to its upper end near the handles, so as to get a good bearing for it against the sides of the strainer; but the wedge or double-beveled face $c\ c$, with a short section of the cylinder C, may be attached to a long handle without departing from the spirit of my invention.

The operation of my device is as follows: The plunger or masher C having been removed from the strainer A, this strainer is nearly filled up with cooked potatoes, and, a dish having been placed under the strainer, the plunger or masher C is introduced with its faces $c\ c$ resting on the potatoes; the plunger is then rotated back and forth by means of the handles D D, at the same time that a certain amount of pressure is exerted downward upon it. By this motion the bevel faces $c\ c$ of the plunger displace and mash the potatoes, and force them through the openings $a$ of the strainer, the peculiar double-bevel-faced shape of the plunger making it easy to accomplish the desideratum with the smallest amount of power, and yet very expeditiously.

Having thus described my invention, what I claim therein as new, and desire to secure by Letters Patent, is—

The double-beveled-faced plunger or potato-masher C, constructed substantially as shown and described, in combination with the strainer A, as and for the purposes set forth.

RÉNÉ SEBILLE.

Witnesses:
JOSEPH PAINÉ,
M. MAIROT.